J. WILHELM.
SAFETY GUARD FOR AUTOMOBILES.
APPLICATION FILED MAR. 7, 1921.

1,378,988.

Patented May 24, 1921.
3 SHEETS—SHEET 1.

Inventor:
John Wilhelm
By Harry A. Beimes
Attorney.

J. WILHELM.
SAFETY GUARD FOR AUTOMOBILES.
APPLICATION FILED MAR. 7, 1921.
1,378,988.
Patented May 24, 1921.
3 SHEETS—SHEET 2.
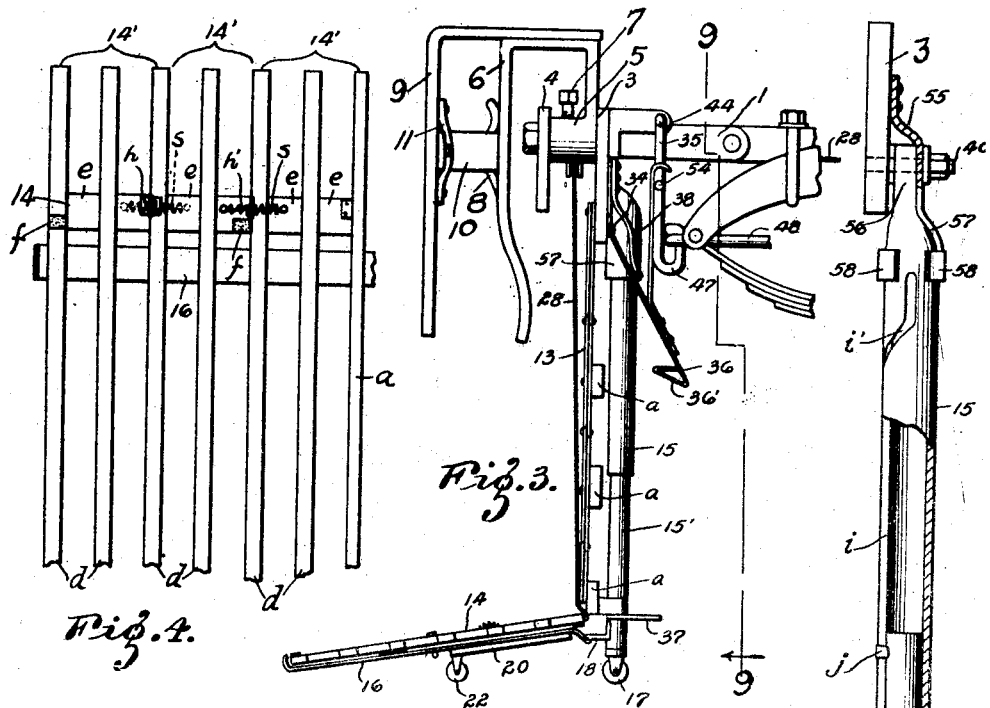
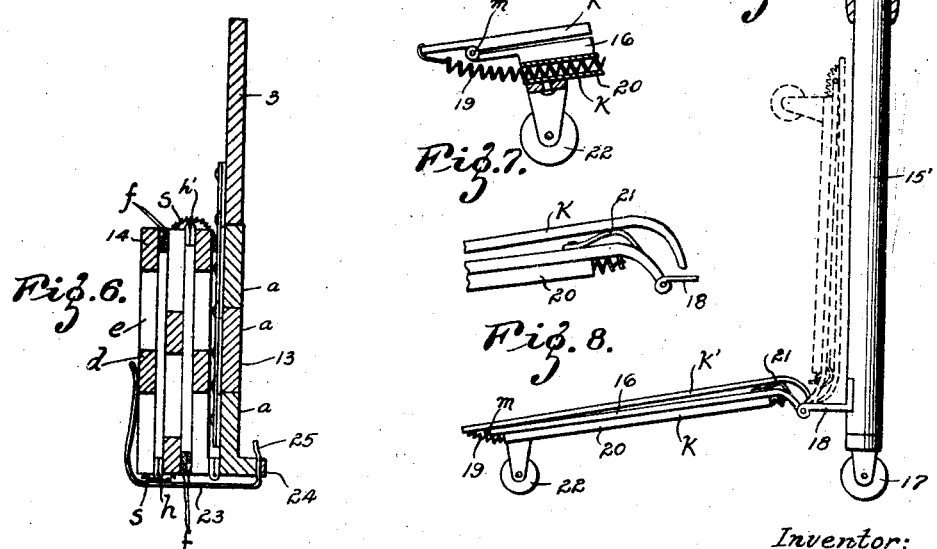
Inventor:
John Wilhelm
By Harry A. Bennes
Attorney.

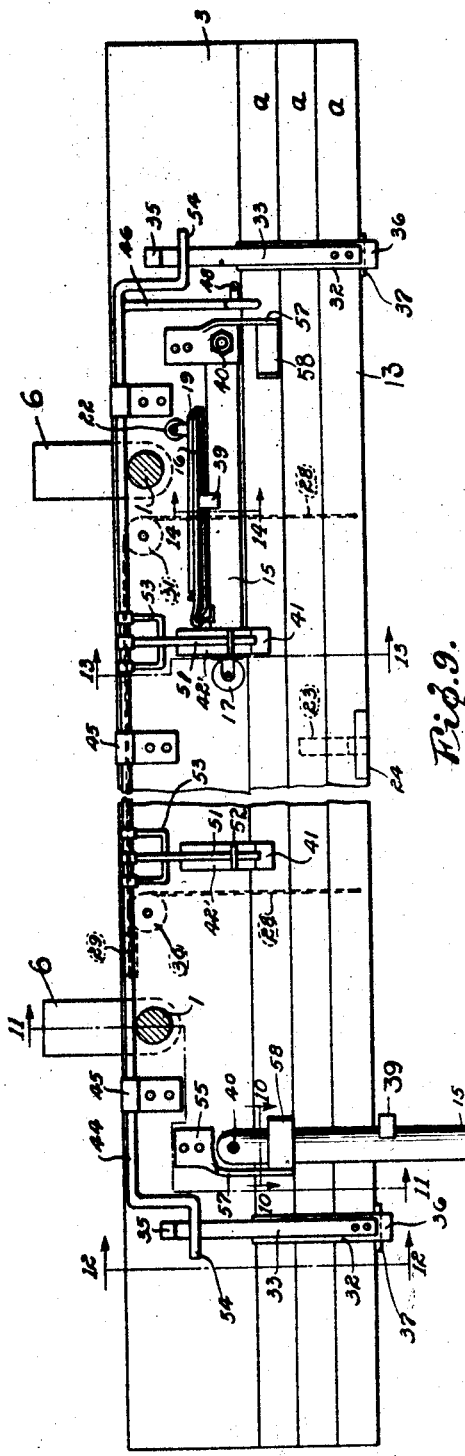

UNITED STATES PATENT OFFICE.

JOHN WILHELM, OF ST. LOUIS, MISSOURI.

SAFETY-GUARD FOR AUTOMOBILES.

1,378,988. Specification of Letters Patent. Patented May 24, 1921.

Application filed March 7, 1921. Serial No. 450,339.

*To all whom it may concern:*

Be it known that I, JOHN WILHELM, a citizen of the United States, residing at St. Louis, State of Missouri, have invented certain new and useful Improvements in Safety-Guards for Automobiles, of which the following is a specification.

My invention has relation to improvements in safety guards for automobiles which consists in an attachment to be applied to the fore part of the automobile frame for the purpose of preventing pedestrians from being run over by the automobile when it is otherwise impossible to avoid their being struck, and the attachment consists in the novel details of construction more fully set forth in the specification and pointed out in the claims. The object of my invention is to provide a safety guard that may be applied to the forwardly projecting frame members of an automobile, and when so applied shall normally serve the purpose of a bumper, a foldable apron being combined therewith which may be released when necessary to form a barrier in front of the automobile wheels for the purpose of picking up a pedestrian that may be run down. A further object is to provide a safety guard that may be compacted within comparatively narrow limits when not in use; one that may be instantly released when the emergency arises; one that may be sufficiently strong to pick up a large person; one that may possess sufficient elasticity to permit of its being released on an uneven road; and one possessing further and other advantages better apparent from a detailed description of the invention in connection with the accompanying drawings in which—

Figure 1:
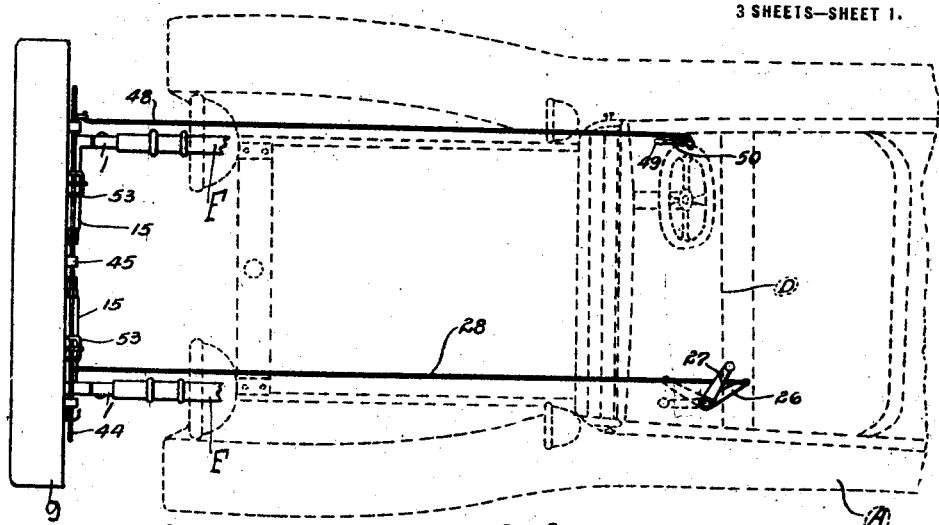
Figure 2:
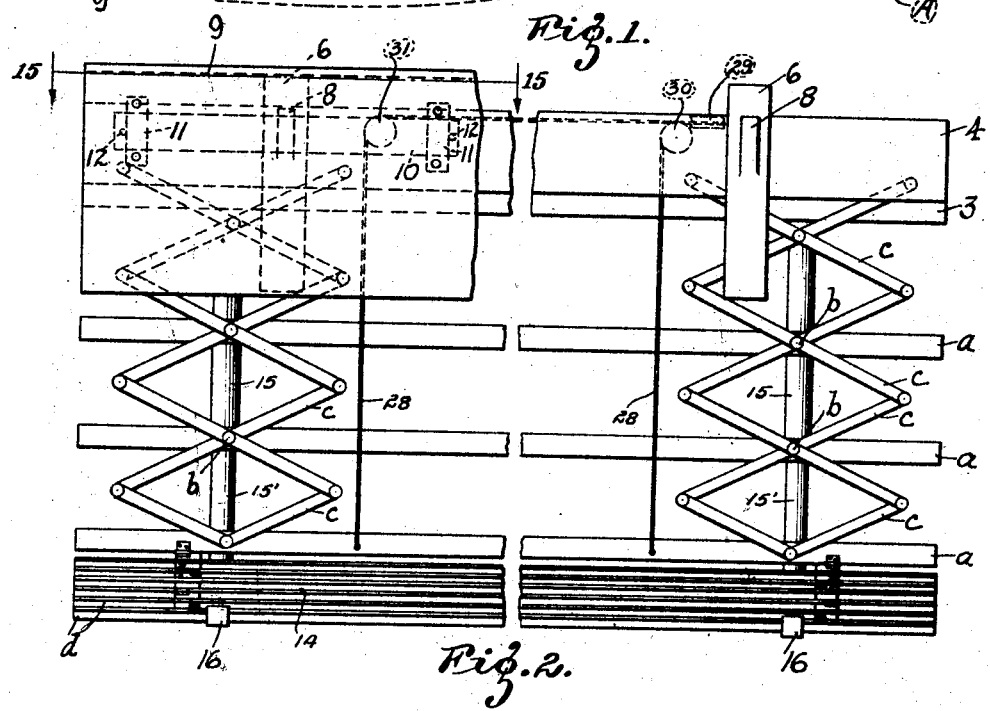
Figure 15:
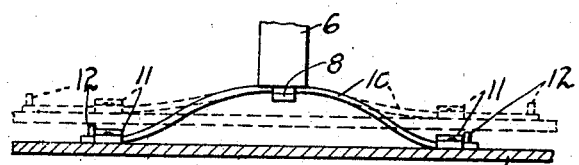

Figure 1 is a plan view of the safety guard applied to an automobile, the outline of the automobile being shown dotted; Fig. 2 is a front elevation of the guard in released position, parts being broken away; Fig. 3 is a side elevation of the same in released position; Fig. 4 is a plan view of a portion of the bottom apron of the guard; Fig. 5 is an enlarged view of one of the supporting posts or standards for the aprons; Fig. 6 is a side elevation of the aprons in folded position; Fig. 7 is an enlarged view of the outer hinge portion of the standard extension for supporting the bottom apron; Fig. 8 is an enlarged view of the inner hinge portion of the standard extension; Fig. 9 is a vertical transverse section taken on the line 9—9 of Fig. 3; Fig. 10 is a horizontal cross section on the line 10—10 of Fig. 9; Fig. 11 is a vertical cross section on the line 11—11 of Fig. 9; Fig. 12 is a vertical cross section on the line 12—12 of Fig. 9; Fig. 13 is a vertical cross section on the line 13—13 of Fig. 9; Fig. 14 is a cross sectional detail on the line 14—14 of Fig. 9; Fig. 15 is a horizontal section on the line 15—15 of Fig. 2; and Fig. 16 is a detached view of the operating lever for releasing the apron and supporting standards.

Referring to the drawings A represents an automobile, the forward ends of the frame F having secured to them in any suitable manner a pair of supporting arms 1, 1 terminating in reduced portions or studs 2, 2 on which are mounted supporting plates 3, 4 maintained in spaced apart relation by the bosses 5, 5 of a pair of U-shaped brackets 6, 6 mounted on the studs 2 and being securely fixed thereto by set-screws 7. The brackets 6 have bent from their outer legs spring retaining fingers 8 which are adapted to support a suitable casing or cover 9 through the agency of buffer springs 10 slidably retained in straps 11, 11 secured to the cover 9. The springs 10 are adapted to be slipped behind the fingers 8, and are prevented from slipping out of the straps 11 by suitable stop pins 12 in the extremities of the spring 10. The cover 9, in addition to concealing the mechanism of the safety guard to be hereinafter described, serves the purpose of a bumper, for should said cover strike another object the buffer springs 10 will yield to the impact and thus absorb the shock.

The safety guard mechanism comprises a vertically disposed apron 13 and a horizontally disposed apron 14 (that is said aprons will be so disposed when the guard is in operative position), and a pair of posts or standards 15 for supporting the vertical apron, each of said standards 15 having an extension arm 16 hinged thereto adapted to receive and support the horizontal apron 14. The vertical apron 13 is composed of a series of bars *a, a, a,* said bars being pivotally connected at points *b, b, b,* to a pair of lazy-tongs devices composed of links *c, c,* etc. The upper links *c, c,* are pivotally connected to the supporting plate 3, and the lower links *c, c,* are pivotally connected to the bottom bar $a$ of the apron 13. The horizontal apron 14 is composed of three units 14', 14', 14', each unit consisting of two bars $d$, $d$, and spacing blocks $e$, $e$, the unit adjacent the vertical apron 13 being hinged to the bottom bar $a$ thereof, and the other units being hinged to each other at points $h$, $h'$. Extending across each hinge $h$, $h'$ are springs $s$ fixed to the under side of the apron units, said springs $s$ operating to impose tension on the units so that they will assume their extended position when released. Suitable rubber pads $f$ are fixed to each of the units 14' as shown (Fig. 4) which pads will come into engagement when the apron 14 is collapsed (Fig. 6) the pads operating to take up the play between the units and prevent the parts from rattling when the automobile is in motion.

The standards 15 are traversed by extension posts 15' in telescopic relation therewith, each standard 15 being provided with a longitudinally disposed slot $i$ in the front wall of the standard, the slot $i$ making a turn of ninety degrees around said wall near the upper end thereof, forming an offset slot $i'$ on the inside wall of each standard. The slot $i$ is traversed by a pin $j$ projecting from each extension post 15', and when the post 15' is slid upwardly within the standard 15, the pin $j$ will travel through the slot $i$, the post 15' making a quarter turn inwardly as the pin $j$ passes through the offset slot $i'$, at which time the post 15' will be completely telescoped within the standard 15. The post 15' carries a swiveled roller or caster 17 on its outer end, and has a hinge bracket 18 secured to it a short distance from said end, to which bracket is hinged the inner member $k$ of the extension arm 16, the member $k'$ of said arm being hinged at $m$ to the member $k$. Secured to the end of member $k'$ adjacent the hinge $m$ is a coiled spring 19, said spring traversing a tube 20 secured to the under side of the member $k$, the spring 19 also being secured to the member $k$ adjacent the hinge 18. A flat spring 21 is secured to the upper side of member $k$ adjacent the hinge 18, and when the members $k$ and $k'$ of the extension arm 16 are folded together, the spring 21 will operate to prevent vibration of said members, said spring also assisting in unfolding the member $k'$ of the extension arm when said arm is released (to be hereinafter explained) the tension of the coiled spring 19 completing the unfolding operation of the member $k'$ whereupon the extension arm assumes its unfolded position shown in Fig. 3. A swiveled caster 22 is mounted on the outer end of the tubing 20, said caster coming in contact with the road when the arm 16 is in its operative position.

When it is desired to fold up the aprons 13, 14 and the standard 15 with its extension arm 16 for an inoperative position of the safety guard, the units 14' of the apron 14 are first folded along the lines of the hinges $h$, $h'$ respectively until the apron 14 occupies the position shown in Fig. 6, the apron 13, however, not yet being contracted. A spring clip 23 is now slipped over the folded units 14', holding said units against the apron 13, a retaining strap 24 being secured to the lower bar $a$ of the apron 13 to receive the upwardly projecting finger 25 of the clip 23. The extended apron 13 with the folded apron 14 bound to it may now be contracted by swinging rearwardly a lever 26 pivoted beneath the footboard D of the automobile, a detachable operating lever 27 being provided for this purpose. The end of the lever 26 has secured to it a pair of cords 28, said cords passing over a horizontally disposed pulley 29 whence one of the cords traverses a pulley 30, the other extending to a pulley 31, both cords then descending to the bar $a$ of the apron 13 to which they are secured. It is thus seen that the apron 13 may be drawn upwardly to its contracted position by merely swinging rearwardly the lever 26, at which time the aprons 13 and 14 are in the position shown in Fig. 6 and Fig. 11. Since the cords 28 do not operate to retain the aprons in their raised or normal position, other means must be provided for this purpose, said means consisting in a pair of spring latches 32, each being hinged on the rear face of the supporting plate 3. An extension finger 33 is fixed to the latch 32 and extends upwardly beyond the hinge point 34 of the latch, said extension finger terminating in a hook 35, and the lower end of the latch terminating in a loop 36 having a cam surface 36'. The lower bar $a$ of the apron 13 is provided with a lug 37 extending rearwardly and in line with the latch 32, and when the apron 13 is raised the lug 37 will engage the cam surface 36' of the latch, forcing said latch outwardly, overcoming the tension of spring 38, until the lug 37 is lodged behind the loop 36, whereupon the spring 38 will snap the latch forwardly, whereupon the lug 37 will be engaged, thus holding the apron 13 in its raised position.

Assuming that the aprons 13 and 14 have been raised, the next operation is to place the standards 15 and extension arm 16 in their normal positions, this being done as follows: The member $k'$ of each extension arm 16 is folded over the member $k$, the latter then being folded upwardly against the extension post 15' (as shown dotted Fig. 5) whereupon the extension post 15' is telescoped within the standard 15 as above described, the arm 16 being held against the standard 15 by means of a finger 39 secured to standard 15, said finger entering between the members $k$, $k'$ as the post 15' is turned inwardly by the passage of the pin *j* through the offset slot *i'* (Figs. 9 and 14). Each standard 15 is now swung inwardly about its stud 40 to a substantially horizontal position behind the supporting plate 3 (Fig. 9) whereupon the outer end of the post 15' will pass between the flaring extremities 41 of a pair of spring jaws 42, 42', the jaw 42' having a bowed portion 43 within which post 15' comes to rest. The standards 15 are now in their normal positions.

The mechanism whereby the safety guard is released may be described as follows: Mounted on the rear face of the supporting plate 3 is a rock shaft 44 supported in suitable bearings 45, said rock shaft having a lever 46 extending downwardly therefrom, said lever terminating in an eye 47 to which a connecting link 48 is slidably coupled, the connecting link 48 extending rearwardly beneath the footboard D where it is connected to the lower end of an operating lever 49 having a fulcrum 50. Loosely mounted on the shaft 44 above the spring jaws 42, 42', is a depending finger 51 extending through an eye 52 projecting from the spring jaw 42', and a U-shaped yoke 53 is fixed to the shaft 44, said yoke being positioned on the side of the finger 51 nearest the plate 3. The shaft 44 is provided with terminal crank arms 54 projecting downwardly on the side of extension fingers 33 farthest from the plate 3, said crank arms operating to engage the fingers 33 with a movement toward the plate 3.

Should a pedestrian step in front of the automobile, the operator may instantly release his safety guard by first throwing his operating lever 49 forwardly, whereupon the connecting link 48 will be drawn toward the rear and the rock shaft 44 rocked so as to cause the yoke 53 to swing the finger 51 to the dotted position (Fig. 13) thus opening the spring jaws 42, 42', whereupon the standard 15 will fall under the force of gravity, the extension post 15' slipping downwardly within the standard and making a quarter turn forwardly, the extension arm 16 being disengaged from the finger 39, the members *k* and *k'* thereof being thrown to their open or extended position under the influence of springs 21 and 19. Having thrown the operating lever 49 forwardly, the operator immediately throws the same backwardly (the lever 49 being shown full in its neutral position in Fig. 16, and the dotted lines indicating the limits of its forward and rearward operating positions) whereupon the connecting link 48 will be pushed forward and the rock shaft 44 oscillated so as to swing the cranks 54 to the position shown dotted (Fig. 12) and rock the latch 32 about its hinge 34, thus releasing the aprons 13 and 14, whereupon they will fall under the force of gravity, the apron 13 opening to its extended position (shown in Fig. 2) and the units 14' of the apron 14 will open up under the influence of the springs *s*. The standards 15 together with their posts 15' and extension arms 16 having been released before the aprons, the extension arms 16 will be in position to receive the apron 14 after the latter has been released. The safety guard is now in its operative position (Fig. 3) to pick up any pedestrian who might be unable to get out of the path of the vehicle before the same can be brought to a stop.

In order to brace the standards 15 while in their operative positions I have provided a housing 55 wherein the extremity 56 of the standard 15 is positioned, said housing 55 being provided with an extension 57 having outwardly flaring resilient walls 58 for receiving the standard 15 after the same has been released.

From the foregoing it will readily appear that my improved safety guard may be instantly released to save a pedestrian from being run down, said guard only being released in an emergency, at all other times being compactly folded within comparatively narrow limits, during which times it may serve the purpose of the ordinary bumper. Obviously the invention is susceptible to modifications, and I do not wish to be restricted to the specific construction herein illustrated.

Having described my invention I claim:

1. In combination with an automobile frame, a safety guard supported on the front of said frame, said guard comprising a supporting plate, an extensible apron consisting of a vertical and horizontal section, said vertical section being suspended from the plate and the horizontal section being hinged to the vertical section, the vertical section being composed of a series of bars pivotally connected to lazy-tongs devices, and the horizontal section being composed of a series of grid units hinged together, and means for supporting the apron sections in their extended positions.

2. In combination with an automobile frame, a safety guard supported on the front of said frame, said guard comprising a supporting plate, an extensible apron secured thereto, said apron being composed of a vertical and a horizontal section, said section being folded adjacent the plate for a normal position, means for holding the apron sections in their normal position, means for releasing the aprons from said holding means permitting the vertical section to assume its extended position under the force of gravity, and means for causing the horizontal section to assume its extended position on being released.

3. In combination with an automobile frame, a safety guard supported on the front of said frame, said guard comprising a supporting plate, an extensible apron secured thereto, said apron being composed of a vertical and a horizontal section, said sections being folded adjacent the plate for a normal position, means for holding the apron sections in their normal position, means for releasing the aprons from said holding means permitting the vertical section to assume its extended position under the force of gravity, means for causing the horizontal section to assume its extended position on being released, means for supporting the apron in its extended position, said last-mentioned means being foldable alongside the supporting plate when the apron is in its normal position, and means for releasing the apron supporting means.

4. In combination with an automobile frame, a safety guard supported on the front of said frame, said guard comprising a supporting plate, an extensible apron secured thereto, said apron having a vertical and a horizontal section, a supporting standard pivoted to the frame, said standard being disposed when in operative position to the rear of the vertical apron section, the free end of the standard terminating in a roller and having a hinged extension arm connected to said free end above the roller, and roller bearings on the extension arm for engagement with the road.

5. In combination with an automobile frame and a safety guard mounted thereon, said safety guard being provided with an extensible apron, a supporting standard for the apron having a telescopic extension inserted therein, and means for causing the extension to move angularly about the standard when said standard and extension are manipulated to full telescoped position.

6. In combination with an automobile frame and a safety guard mounted thereon, said safety guard having an apron extending in front of the wheels of the automobile, a supporting standard for the apron, said standard being provided with an extensible member adapted to engage the road for operative position, a jointed supporting arm hinged to the extensible member, means for retaining said arm and standard out of engagement with the road for inoperative position, and means for releasing the arm and standard to operative position.

7. In combination with an automobile frame, a safety guard mounted thereon, said guard comprising a supporting plate, a foldable apron composed of two sections suspended from the plate, a pair of spring brackets adapted to maintain the lower apron section in folded position, a spring latch adapted to maintain the upper apron section in folded position, a pair of telescoping standards pivotally secured to the supporting plate, said standards having foldable extension arms hinged near their free ends, the extensions being folded against the standards, and the standards being swung to a position alongside the supporting plate for a normal position, retaining springs for holding the standards and extensions is such position, means for releasing the standards whereupon they will fall under influence of gravity to operative position, means for causing the extensions to unfold simultaneously with the movement of the standards, and means for releasing the apron permitting it to unfold and fall upon the aforesaid standards and extensions.

In testimony whereof I hereunto affix my signature.

JOHN WILHELM.